United States Patent
Philip

(10) Patent No.: US 9,923,630 B2
(45) Date of Patent: Mar. 20, 2018

(54) ANALYZING OPTICAL NETWORKS

(71) Applicant: Lockheed Martin Corporation, Bethesda, MD (US)

(72) Inventor: Joe S. Philip, Hurst, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 15/133,574

(22) Filed: Apr. 20, 2016

(65) Prior Publication Data

US 2017/0310388 A1    Oct. 26, 2017

(51) Int. Cl.
*H04B 10/071*    (2013.01)
*H04B 10/077*    (2013.01)

(52) U.S. Cl.
CPC ....... *H04B 10/071* (2013.01); *H04B 10/0771* (2013.01); *H04B 10/0775* (2013.01)

(58) Field of Classification Search
CPC .............. H04B 10/071; H04B 10/0775; H04B 10/0771
See application file for complete search history.

(56) References Cited

U.S. PATENT DOCUMENTS

| | | | |
|---|---|---|---|
| 4,875,772 A | 10/1989 | Gentile | |
| 5,131,743 A | 7/1992 | Kaneko et al. | |
| 5,179,420 A | 1/1993 | So et al. | |
| 5,210,703 A | 5/1993 | Hodgson | |
| 6,388,741 B1 | 5/2002 | Beller | |
| 6,534,997 B1* | 3/2003 | Horishita | H04B 10/07 324/533 |
| 6,561,454 B1 | 5/2003 | White | |
| 6,710,862 B1 | 3/2004 | Wilson et al. | |
| 6,947,147 B2 | 9/2005 | Motamedi et al. | |
| 7,030,975 B2 | 4/2006 | Harres | |
| 7,095,493 B2 | 8/2006 | Harres | |
| 7,995,197 B2 | 8/2011 | Sikora et al. | |
| 8,213,002 B2 | 7/2012 | Kassler et al. | |
| 8,798,467 B2 | 8/2014 | Chan et al. | |
| 9,197,319 B2 | 11/2015 | Lee | |
| 2004/0070750 A1 | 4/2004 | Iannelli et al. | |
| 2005/0089083 A1* | 4/2005 | Fisher | H04B 1/7075 375/130 |
| 2011/0116799 A1* | 5/2011 | Effenberger | G01M 11/3136 398/79 |
| 2014/0111795 A1 | 4/2014 | Barnhart et al. | |

(Continued)

*Primary Examiner* — Dzung Tran
(74) *Attorney, Agent, or Firm* — Baker Botts L.L.P.

(57) ABSTRACT

In one embodiment, a system for analyzing optical networks includes a network analyzer optically coupled to a fiber optic network. The network analyzer may transmit a test signal to the fiber optic network, receive a reflected signal in response to transmitting the test signal, wherein the reflected signal is generated in response to the test signal interacting with a defect of the fiber optic network. The analyzer may then analyze a power of the reflected signal, wherein the power of the reflected signal corresponds to the defect in the fiber optic network, calculate a transmit time of the reflected signal, wherein the transmit time corresponds a location of the defect in the fiber optic network, identify a component of the fiber optic network corresponding to the defect and the location of the defect in the fiber optic network, and generate a maintenance report based on the analyzed reflected signal.

20 Claims, 4 Drawing Sheets

(56) References Cited

U.S. PATENT DOCUMENTS

| | | |
|---|---|---|
| 2014/0146312 A1 | 5/2014 | Perron et al. |
| 2014/0161144 A1* | 6/2014 | Xu .................. H01S 5/141 |
| | | 372/6 |
| 2014/0226148 A1 | 8/2014 | Lane et al. |
| 2015/0110484 A1* | 4/2015 | Lin ............ H04B 10/07957 |
| | | 398/16 |
| 2015/0198503 A1 | 7/2015 | Leblanc et al. |
| 2016/0006503 A1 | 1/2016 | Chen et al. |

\* cited by examiner

ANALYZING OPTICAL NETWORKS

GOVERNMENT INTEREST

This invention was made with government support under Contract No. N00019-09-C-0010 awarded by the Department of the Navy. The government has certain rights in the invention.

TECHNICAL FIELD

This disclosure generally relates to network communications and, more specifically, to analyzing optical networks.

BACKGROUND

Fiber optics are used for a number of applications including telecommunications and cable television transmissions. Fiber optic networks are also becoming standard in commercial, military, and unmanned aircrafts ("fly-by-light" networks). Fiber optic networks have lower attenuation and interference than typical copper wire systems while offering superior transmission speeds. However, anomalies in the physical layer of the fiber optic network such as air gaps, end face geometry mismatches, broken fiber links, and high bend radiuses may affect the quality and reliability of the fiber optic network.

SUMMARY OF PARTICULAR EMBODIMENTS

In accordance with the present disclosure, disadvantages and problems associated with analyzing fiber optic networks may be reduced or eliminated.

In one embodiment, a system for analyzing optical networks includes a network analyzer optically coupled to a fiber optic network. The network analyzer may transmit a test signal to the fiber optic network, receive a reflected signal in response to transmitting the test signal, wherein the reflected signal is generated in response to the test signal interacting with a defect of the fiber optic network. The analyzer may then analyze a power of the reflected signal, wherein the power of the reflected signal corresponds to the defect in the fiber optic network, calculate a transmit time of the reflected signal, wherein the transmit time corresponds a location of the defect in the fiber optic network, identify a component of the fiber optic network corresponding to the defect and the location of the defect in the fiber optic network, and generate a maintenance report based on the analyzed reflected signal.

In an example embodiment, a method for analyzing optical networks includes transmitting, using a network analyzer optically coupled to a fiber optic network, a test signal to the fiber optic network. The method further includes receiving a reflected signal in response to transmitting the test signal, wherein the reflected signal is generated in response to the test signal interacting with a defect of the fiber optic network. The method may then analyze a power of the reflected signal, wherein the power of the reflected signal corresponds to the defect in the fiber optic network and calculate a transmit time of the reflected signal, wherein the transmit time corresponds a location of the defect in the fiber optic network. The method may then identify a component of the fiber optic network that corresponds to the defect and the location of the defect in the fiber optic network and generate a maintenance report based on the analyzed reflected signal.

Technical advantages of certain embodiments may include reducing the time needed to locate anomalies in the physical layer of a fiber optic network by specifically identifying the location and component within the fiber optic network causing a defect. Another advantage provided by certain embodiments allows for the seamless integration of a fiber optic analyzer within the optical network. Integrating a fiber optic network analyzer into the fiber optic network may reduce the need manually test individual systems or open up multiple portions of a fiber optic system.

Other technical advantages will be readily apparent to one skilled in the art from FIGS. 1-4, descriptions, and claims. Moreover, while specific advantages have been enumerated above, various embodiments may include all, some, or none of the enumerated advantages.

DESCRIPTION OF EXAMPLE EMBODIMENTS

Figure 1:
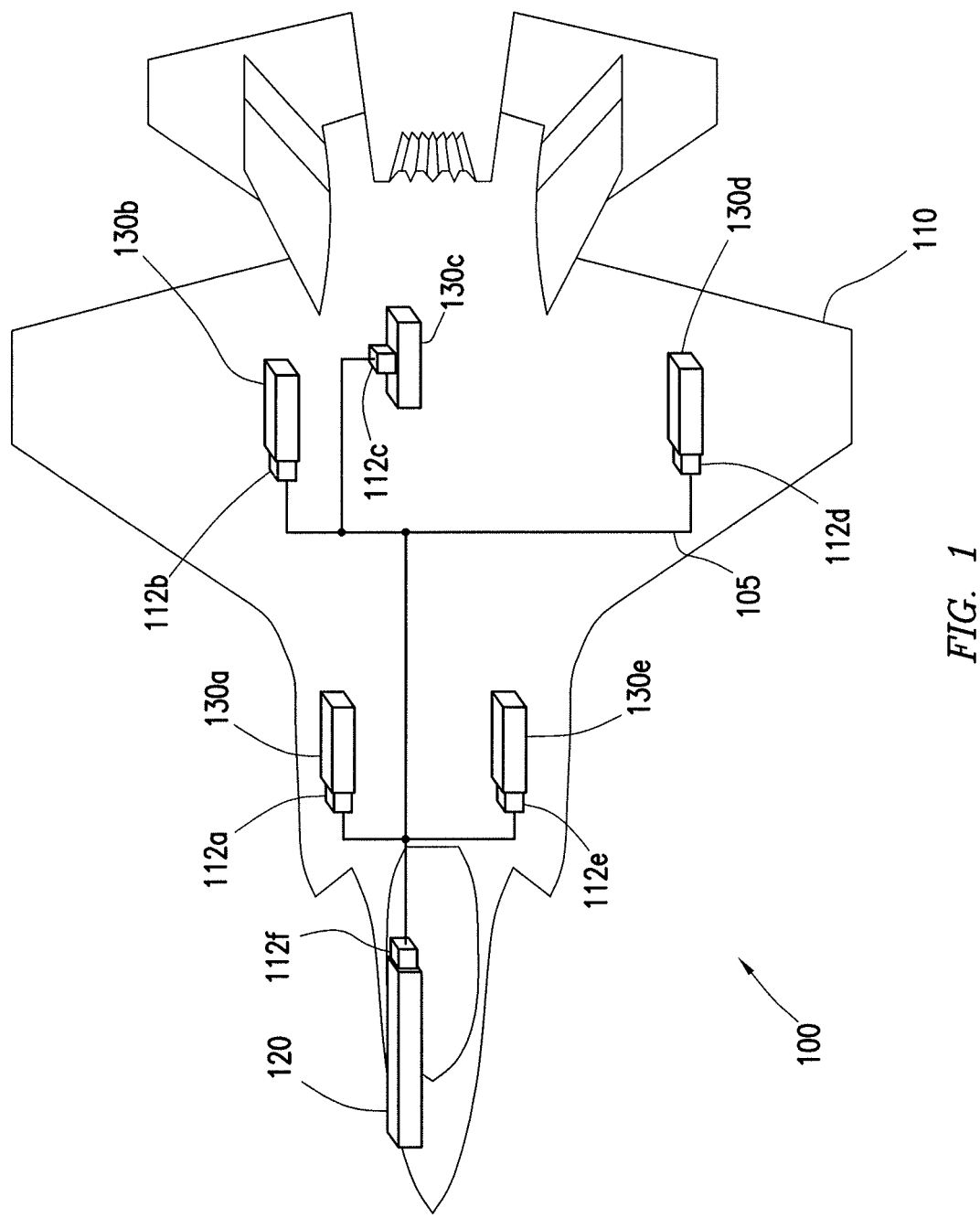
FIG. 1 illustrates an example fiber optic network for an aircraft according to certain embodiments.

To facilitate a better understanding of the present disclosure, the following examples of certain embodiments are given. The following examples are not to be read to limit or define the scope of the disclosure. Embodiments of the present disclosure and its advantages are best understood by referring to FIGS. 1 through 4, where like numbers are used to indicate like and corresponding parts.

Fiber optics are used for a number of applications including telecommunications and cable television transmissions. Fiber optic networks are also becoming standard in commercial, military, and unmanned aircrafts ("fly-by-light" networks). Fiber optic networks have lower attenuation than typical copper wire systems while offering superior transmission speeds. Furthermore, fiber optics are less susceptible to electromagnetic interference and safe from short circuiting. However, anomalies in the physical layer of the fiber optic network such as air gaps, end face geometry mismatches, broken fiber links, and high bend radiuses may affect the quality and reliability of the fiber optic network.

For example, an aircraft may utilize a fiber optic network to control a number of subsystems, including radar, communication, navigation, or any other suitable systems. These systems may be connected to one or more processors within the aircraft using fiber optic connectors or interfaces. Communication over the fiber optic network is achieved by pulsing light (i.e., photons) through the fiber optics. However, if an anomaly (i.e., a defect) exists within the fiber optic network, the anomaly may affect the ability for the light to travel from the processor to the subsystems. Thus, the anomalies may lead to communication errors within the optical network, which may negatively affect the overall system performance.

Several techniques have attempted to analyze and identify anomalies that may exist within a fiber optic network. For instance, some techniques for analyzing a fiber optic network may require connecting a plurality of analyzers, such as optical time-domain reflectometers (OTDR), to the fiber optic network in order to test each individual system.

However, utilizing multiple OTDRs to test individual systems requires additional equipment, which requires more room and adds weight to the system.

To non-invasively but comprehensively identify anomalies in a fiber optic network, embodiments of the present disclosure may include a fiber optic analyzer interfaced with a processor. For example, on an aircraft, a core processor may control a number of systems and sub-systems via fiber optic, including the radar system, navigation system, and flight controls. The analyzer may interface with the processor and utilize a number of tests to identify anomalies in the optical network. For instance, the analyzer may utilize an optical backscatter reflectometer to inspect and diagnose the fiber optic network. Anomalies such as air gaps, end face geometry mismatches, broken fiber links, damaged fibers, and high bend radiuses may reflect the light transmitted through the fiber optic network back towards the analyzer. The analyzer may receive and measure the power of the reflected light.

The analyzer may then convert the measured reflectance into a fiber optic network report. For example, the analyzer may measure a spike in the reflected light. Based on the time delay and power of the reflected light, as well as knowledge of the fiber optic network, the analyzer can translate the measurement into an identification of a specific defect occurring at a specific location in the fiber optic network. By knowing the layout and distance of the fiber optic cable and the location and type of connectors used to interface the fiber optic cable with the system components, the analyzer may associate certain measurements with specific types of anomalies.

Once the defects are identified, the analyzer may generate a system performance report that identifies the location and type of defects detected in the fiber optic network. In some embodiments the analyzer may also generate a maintenance report identifying the defects, where the defects are located in the optical network, and how to resolve the defect.

Interfacing a fiber optic network analyzer with a core processor to test multiple systems in a fiber optic network provides a number of technical advantages not realized by current systems. Certain embodiments may reduce the time needed to locate anomalies in the physical layer of a fiber optic network by specifically identifying the location and connector within the fiber optic network causing a defect. Another advantage provided by certain embodiments allows for the seamless integration of a fiber optic analyzer within the communications system. Integrating a fiber optic network analyzer into the communications system may reduce the need to manually test individual systems or open up multiple portions of a fiber optic system. FIGS. 1-4 provide additional details of the fiber optic network analyzer system that may provide these and other advantages.

FIG. 1 illustrates an example fiber optic network 100 for an aircraft 110 according to certain embodiments. In the illustrated embodiment, aircraft 110 includes a processor 120 coupled to subsystems 130a-e (collectively "subsystems 130") via fiber optics 105.

Processor 120 represents any suitable hardware and/or software for executing instructions, such as those making up a computer program. Processor 120 may communicate and/or control one or more subsystems 130 of aircraft 110. In some embodiments, processor 120 may be an integrated core processor that controls multiple subsystems 130. As an example and not by way of limitation, to execute instructions, processor 120 may retrieve (or fetch) the instructions from an internal register, an internal cache, memory, or storage; decode and execute the instructions; and then write one or more results to an internal register, an internal cache, memory, or storage.

In particular embodiments, processor 120 may include one or more internal caches for data, instructions, or addresses. This disclosure contemplates processor 120 including any suitable number of any suitable internal caches, where appropriate. As an example and not by way of limitation, processor 120 may include one or more instruction caches, one or more data caches, and one or more translation lookaside buffers (TLBs). Instructions in the instruction caches may be copies of instructions in memory or storage, and the instruction caches may speed up retrieval of those instructions by processor 120. The TLBs may speed up virtual-address translation for processor 120. In particular embodiments, processor 120 may include one or more internal registers for data, instructions, or addresses. This disclosure contemplates processor 120 including any suitable number of any suitable internal registers, where appropriate. Where appropriate, processor 120 may include one or more arithmetic logic units (ALUs); be a multi-core processor; or include one or more processors 120. Although this disclosure describes and illustrates a particular processor, this disclosure contemplates any suitable processor.

Processor 120 may communicate and/or control one or more subsystems 130 over fiber optic network 100. Processor 120 may be optically and/or electrically coupled to subsystems 130 using fiber optics 105.

Fiber optics 105 used in fiber optic network 100 may be any suitable fiber capable of transmitting light pulses between components of aircraft 110. For example, fiber optics 105 may include a 50/125 µm multimode fiber, a 62.5/125 µm multimode fiber, and/or a 9/125 µm single mode fiber. The type of fiber optics 105 may also depend on its intended use. For example, the type of fiber optics 105 may depend on standards required for military, commercial, telecommunications, outdoor, and/or offshore standards. Although illustrated as a single line, fiber optics 105 may include multiple strands of fiber optics 105.

Fiber optics 105 may connect processor 120 to subsystem 130 using one or more connectors 112a-f (collectively "connectors 112"). For example, processor 120 may be optically coupled to subsystem 130a via fiber optics 105. Fiber optics 105 may interface with processor 120 via connector 112f. Similarly, fiber optics 105 may interface with subsystem 130a via connector 112a. Connectors 112 represent any suitable connectors 112 operable to interface fiber optics 105 with processor 120 and subsystems 130. The type and capabilities of connectors 112 may depend on a number of factors including the application of fiber optic network 100 (i.e., military vs commercial), the environment of fiber optic network 100, and the subsystem 130 being interfaced. For example, in some embodiments, connectors 112 may be a standard military connector such as MIL-DTL-38999 fiber optic interconnection.

Subsystems 130 represent any suitable subsystem utilized by aircraft 110. For example, and not by way of limitation, subsystems 130 may include a radar system, a communication system, a weapons system, navigation, aircraft propulsion system, and any other suitable systems or subsystems. These subsystems 130 may themselves have their own subsystems, which may include additional processors and fiber optics 105.

In some embodiments, fiber optic network 100 may utilize wavelength-division multiplexing (WDM) to increase the capacity of the network 100 without needing additional fiber optics 105. For example, using WDM, fiber optic network 100 may multiplex a number of optical carrier signals onto a single optical fiber by using different wavelengths. Reducing the number of fiber optics—and thereby the number of receiver components—may reduce the overall weight of the aircraft.

Modifications, additions, or omissions may be made to system 100 without departing from the scope of the disclosure. For example, although FIG. 1 is illustrated using aircraft 110, fiber optic network 100 may be used in a number of various vehicles and/or devices. For instance, fiber optic network 100 may be implemented in a ship, Humvee, or other vehicle.

Figure 2:
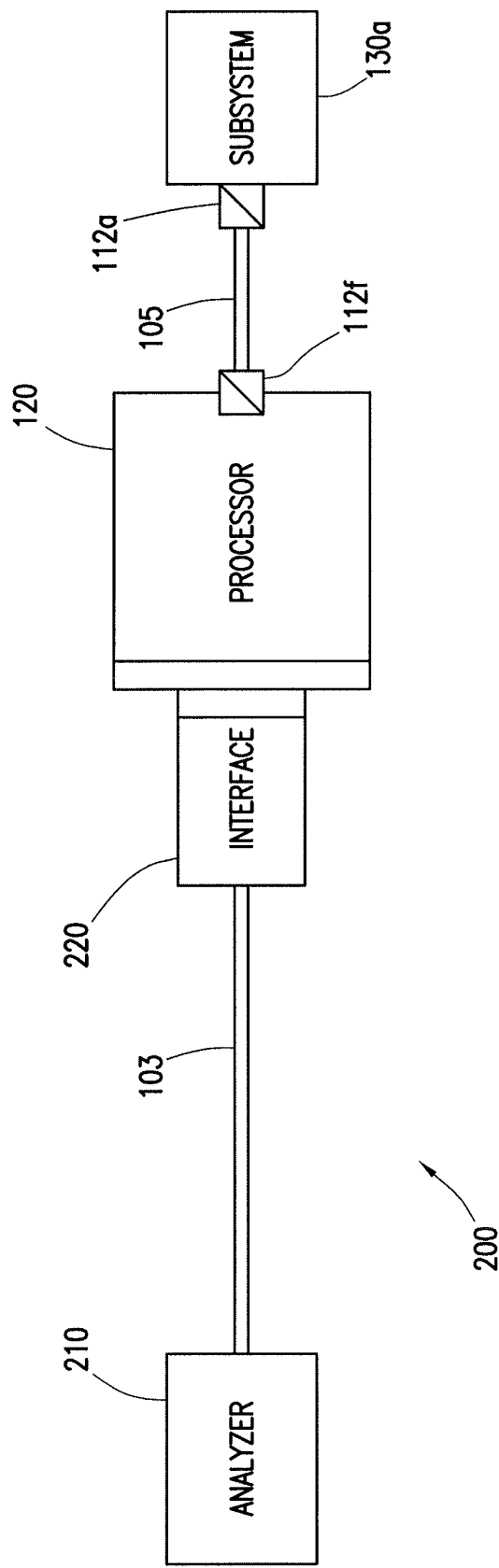
FIG. 2 illustrates a diagram of an example fiber optic test setup according to certain embodiments.
Figure 3:
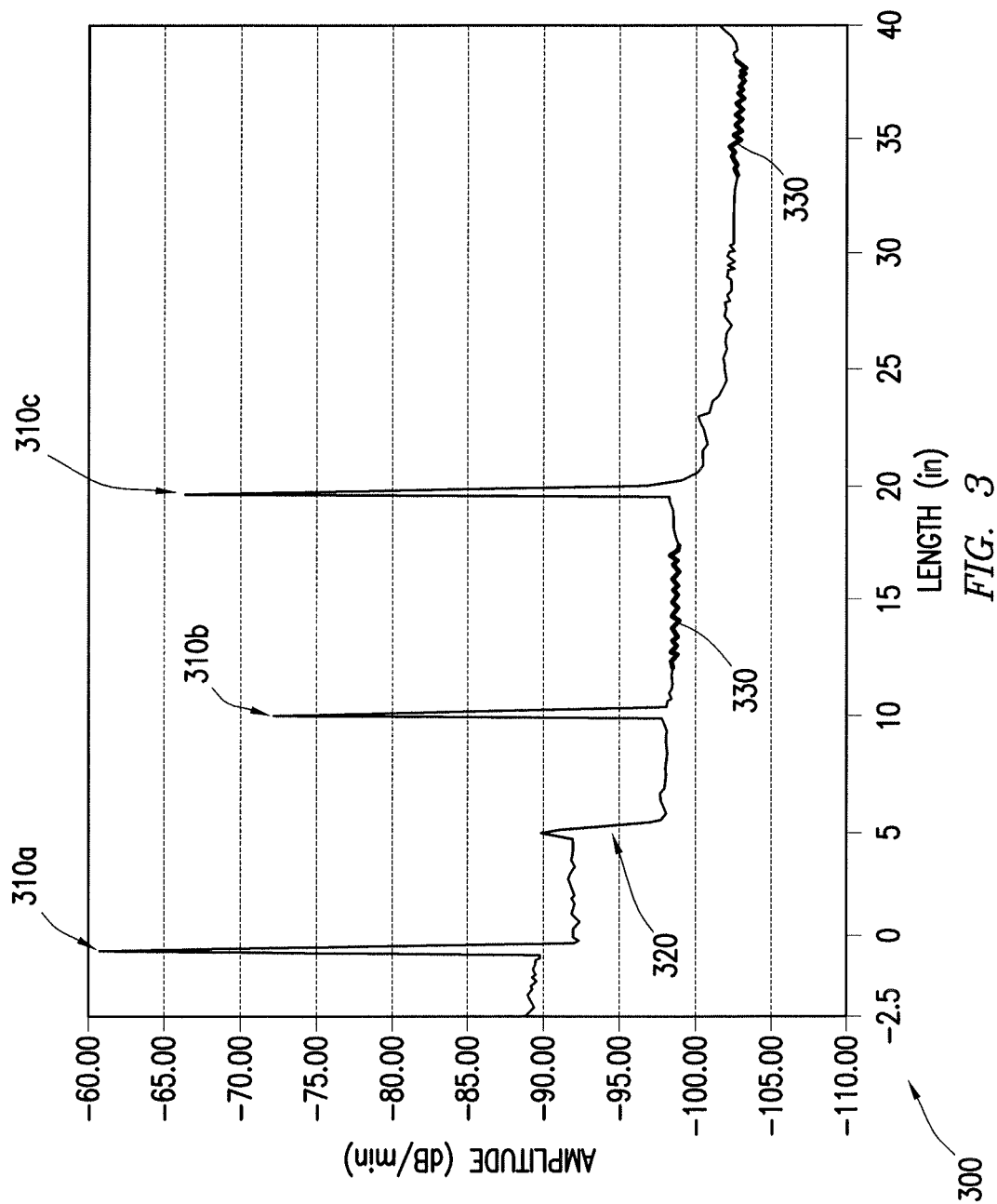
FIG. 3 illustrates example analysis from a fiber optic network analyzer according to certain embodiments.

Depending on the size and complexity of fiber optic network 100, a number of issues such as air gaps, end face geometry mismatches, broken fiber links, and high bend radiuses may affect the quality and reliability of fiber optic network 100. FIGS. 2 and 3 explain how these issues may be identified efficiently and non-invasively according to embodiments of the present disclosure.

FIG. 2 illustrates a diagram of an example fiber optic test setup 200 according to certain embodiments. In the illustrated embodiment, test setup 200 includes analyzer 210, interface 220, processor 120, connectors 112a and 112f, and subsystem 130a.

According to embodiments of the present disclosure, test setup 200 may be arranged in a number of layouts. For example, the elements of test setup 200 may be split between an avionic rack and aircraft 110. Analyzer 210 may be connected to interface 220 via a light conduit such as a fiber optic test cable 103. Analyzer 210 and interface 220 may be arranged on an avionic rack which is capable of being moved from one aircraft 110 to another. Processor 120, connectors 112, and subsystem 130a may be installed in aircraft 110. This arrangement of test setup 200 may be beneficial when analyzer 210 and interface 220 are needed to quickly analyze fiber optic network 100 in aircraft 110.

In some embodiments, the elements of test setup 200 may be incorporated entirely within aircraft 110. For example, aircraft 110 may include analyzer 210 coupled to processor 120 via interface 220. Incorporating test setup 200 in aircraft 110 allows for the testing of fiber optic network whenever needed, even if test equipment would not otherwise be available.

In an example embodiment, the elements of test setup 200 may be entirely removed from aircraft 110. For example, during the design, testing, and debugging of subsystem 130a (e.g., testing the radar system) it may be beneficial to have the radar system removed from aircraft 110. In this manner, embodiments of the present disclosure allow for highly customizable test setup 200 regardless of where analyzer 210, processor 120, and subsystems 130 are located.

Analyzer 210 represents any suitable device operable to analyze fiber optic network 100. For example, in some embodiments, analyzer 210 may analyze fiber optic network 100 by performing a high-speed, swept-laser interferometric interrogation of fiber optic network 110 using an optical backscatter reflectometer ("OBR").

In some embodiments, the test signal output from analyzer 210 may be from a single mode laser but the subsystem application of fiber optic network 100 may comprise a multimode cable. Thus, in some embodiments, test setup 200 may include a mode conditioner between analyzer 210 and interface 220. The mode conditioner may offset the single mode signal from analyzer 210 into the multimode fiber to avoid bit errors caused by differential mode delay.

In some embodiments, analyzer 210 tests fiber optic network 100 by transmitting a number of short-duration laser pulses along fiber optic test setup 200 to processor 120 through interface 220. While traveling through fiber optic network 100, the laser pulses will reflect and refract at every index of refraction as they travel to subsystem 130a. Analyzer 210 may then measure the reflected laser pulses, including the time delay between the emission of the laser pulse and the detection of the reflected signal. In this manner, analyzer 210 may determine the distance traveled by the laser signal and the power of the received reflected laser pulse.

As an example illustration, test setup 200 may be used to determine whether the navigation subsystem 130a of aircraft 110 is properly functioning. Interface 220 may be coupled to processor 120 at the proper port to test navigation subsystem 130a. Analyzer 210 may then send a series of short-duration, high-power laser pulses along test setup 200. In some embodiments, connector 112a may have a cracked ceramic sleeve and may not be fully engaged with navigation subsystem 130a. As light pulses from analyzer 210 reach connector 112a a portion of the pulse may be reflected back along fiber optics 105, through fiber optic test cable 103 and back to analyzer 210.

Analyzer 210 may receive the reflected signal and calculate the distance traveled by the reflected signal based on the time taken for the reflected signal to reach analyzer 210. Furthermore, analyzer 210 may measure the power of the reflected signal. With these measurements, analyzer 210 may determine the distance the laser pulse traveled before encountering defective connector 112a for navigation subsystem 130a, and may further measure the significance of the defect based on the measured reflected signal.

Knowing which subsystems 130 are being tested and the distance traveled by the laser pulse before encountering the defect allows analyzer 210 to determine the specific location and type of defect in fiber optic network 100, including whether the location corresponds to a connector 112, fiber optics 105, processor 120, or subsystem 130.

As an example, analyzer 210 may determine that based on the travel time of a received reflected signal, a defect occurred 72 inches into the portion of fiber optic network 100 that controls subsystem 130a. Analyzer 210 may search its database for the connector 112 or component that is used 72 inches into fiber optic network 100. In some embodiments, no connector or component may exist at that location in fiber optic network 100, which may indicate that a defect exists in fiber optics 105, such as a high bend radius.

In some embodiments, analyzer 210 may utilize the measured relative optical reflectance of the laser pulse to further determine the type and extent of the defect in fiber optic network 100. For example, based on the calculated distance to the defect, analyzer 210 may determine that the defect is part of a connector 112. Based on the subsystem 130 being tested and the location of the defect, analyzer 210 may determine the type of connector (e.g., a D38999 type connector) causing the error. Based on the connector type and the reflected signal, analyzer 210 may determine the error causing the defect in fiber optic network 100.

Once analyzer 210 determines one or more of: the type of defect, the component causing the defect, the location of the defect, and the magnitude of the defect, analyzer 210 may generate a maintenance report describing the status of fiber optic network 210. The maintenance report generated by analyzer 210 may be in any suitable format and may include any suitable information.

In some embodiments, the maintenance report may have a list of every connector 112 and component in the subsystem 130 being tested. For each connector 112, analyzer 112 may indicate the mating quality of each connector 112. For example, the maintenance report may indicate based on the reflected signals whether the mating quality of each connector 112 is bad, marginal, good, or excellent. In some embodiments, the maintenance report may only state whether each connector 112 passes or fails a fiber optic network test based on the reflected signals received at analyzer 210 (e.g., a connector fails if creates a reflected signal above a certain threshold, otherwise the connector passes).

In some embodiments, the maintenance report may indicate a certain type of defect that may be present in connector 112 based on the reflected signals received by analyzer 210. For example, a connector type that produces a relative optical reflectance that deviates from the baseline by more than a certain value (e.g., 10 dB/mm) may correspond with a specific type of defect. For instance, analyzer 210 may correlate a relative optical reflectance measurement that is greater than −50 dB/mm with an air gap, dirty end face, and/or a cracked sleeve of connector 112. Alternatively, analyzer 210 may correlate a relative optical reflectance measurement that is less than −90 dB/mm with a connector that is fully engaged and has no air gap.

Based on the magnitude or severity of the defect, and the type/location of the defect, the maintenance report may also include a specified maintenance activity. For example, in response to analyzer 210 determining that the mating quality of connector 112a is bad, the maintenance report may further indicate the activity needed to resolve the bad mating quality. For instance, the maintenance report may indicate that a visual inspection of the end face of connector 112a is needed and connector 112a needs to be tightened and/or cleaned. In some embodiments, the suggested maintenance activity may be specific to the type of connector 112, or based on known issues that arise with specific connectors 112.

In some embodiments, the maintenance report may further indicate the expected system performance based on the current state of fiber optic network 100. For example, once an analysis is performed on subsystem 130 and the mating quality of connectors 112 and condition of fiber optics 105 are known, the maintenance report may indicate that the system is stable, or operating within allotted performance criteria. In certain embodiments, the maintenance report may indicate a poor system performance based on an indication that connectors 112 and/or fiber optics 105 are in a failing or poor condition.

In some embodiments, analyzer 210 may perform additional tests to check the performance of fiber optic network 100. For example, depending on the results of the optical backscatter test, analyzer 210 may perform a bit error rate test to determine whether an identified defect will cause errors in the communication of signals between subsystems 130 and processor 120.

Designing test setup 200 in this manner may lead to a number of advantages. For example, in some embodiments, connectors 112 may be buried under hardware components or may require additional panels on the aircraft to be removed. By interfacing analyzer 210 directly to processor 120 instead of connectors 112, analyzer 210 may analyze the entirety of fiber optic network 100 from processor 120 to subsystem 130. Another important advantage of test setup 200 is that interfacing with processor 120 allows for minimal intrusion in the fiber optic network between processor 120 and subsystem 130. This allows each connector 112, as well as the entire length of fiber optics 105, to be tested without interruption, which provides a complete, end-to-end analysis of the communication network.

A component of test setup 200 may include an interface, logic, memory, and other suitable elements. An interface receives input, sends output processes the input and/or output, and performs other suitable operations. An interface may comprise hardware and software. Logic performs the operation of the component. For example, logic executes instructions to generate output from input. Logic may include hardware, software and other logic. Logic may be encoded in one or more non-transitory, tangible media, such as a computer readable medium or any other suitable tangible medium, and may perform operations when executed by a computer. Certain logic, such as a processor, may manage the operation of a component. Examples of a processor include one or more computers, one or more microprocessors, one or more applications, and other logic.

Modifications, additions, or omissions may be made to fiber optic test setup 200 without departing from the scope of the disclosure. In some embodiments, test setup 200 may include a fiber optic switch. This may allow for multiple subsystems 130 to be tested concurrently. To further illustrate how fiber optic test setup 200 analyzes fiber optic network 100, FIG. 3 shows an example analysis 300 of fiber optic network 100.

FIG. 3 illustrates example analysis 300 from a fiber optic network analyzer 210 according to certain embodiments. The illustrated example analysis 300 shows a number of defects in fiber optic network 100 detected by analyzer 210. As explained in FIG. 2, once analyzer 210 detects these defects, analyzer 210 may translate the defects into a maintenance report that indicates the location of the defects, the component causing the defect (e.g., connector 112 and/or fiber optics 105), the severity of the defect, an explanation of what is causing the defect, how the defect can be resolved, and/or how the system is likely to perform with the defect.

Example analysis 300 illustrates several types of defects that may be detected by analyzer 210. For example, analyzer 210 may represent defects caused by connector 112 as spikes 310a-c (collectively "spikes 310") due to Fresnel reflections of the test signal. Analyzer 210 may represent defects caused by fiber optics 105 as a steep drop 320. Steep drop 320 may be caused by defects such as a splice, bend, or tight clamp in or on fiber optics 105. Relatedly, a difference in baseline measurements 330, may indicate a loss in signal strength caused by faulty fiber optics 105.

Once analyzer 210 performs the analysis of fiber optic network 100, analyzer 210 may then convert the results into a maintenance report. As an example illustration, analyzer 210 may run an analysis of subsystem 130b. Analyzer 210 may identify spike 310b and determine that spike 310b corresponds to connector 112b ten inches into the portion of fiber optic network 100 that corresponds to subsystem 130b. Analyzer 210 may then search its database for the type of connector that corresponds to that location of subsystem 130b. Analyzer 210 may then determine that based on the severity of spike 310b and the type of connector 112b, that connector 112b has a marginal mating quality. Based on the type of connector and the marginal mating quality, analyzer 210 may determine that the defect is caused by an air-gap and/or a dirty end face of connector 112b. Analyzer 210 may also indicate that to remove the defect, a visual inspection should be performed on connector 112b as well as cleaning the end face. In some embodiments, analyzer 210 may also indicate that the defect in connector 112b is currently within the tolerances allowed by the system but could degrade over time if additional contaminants are introduced to the connector 112b end face.

In this manner, analyzer 210 may perform an analysis on fiber optic network 100, identify the defects in fiber optic network 100, convert the identified defects in fiber optic network 100 into a maintenance report which may then be communicated to the proper personnel to resolve.

Modifications, additions, or omissions may be made to analysis 300 without departing from the scope of the disclosure. For example, although analysis 300 was illustrated showing spikes 310, steep drop 320 and baseline differences 330, any suitable defects may be analyzed by analyzer 210.

Figure 4:
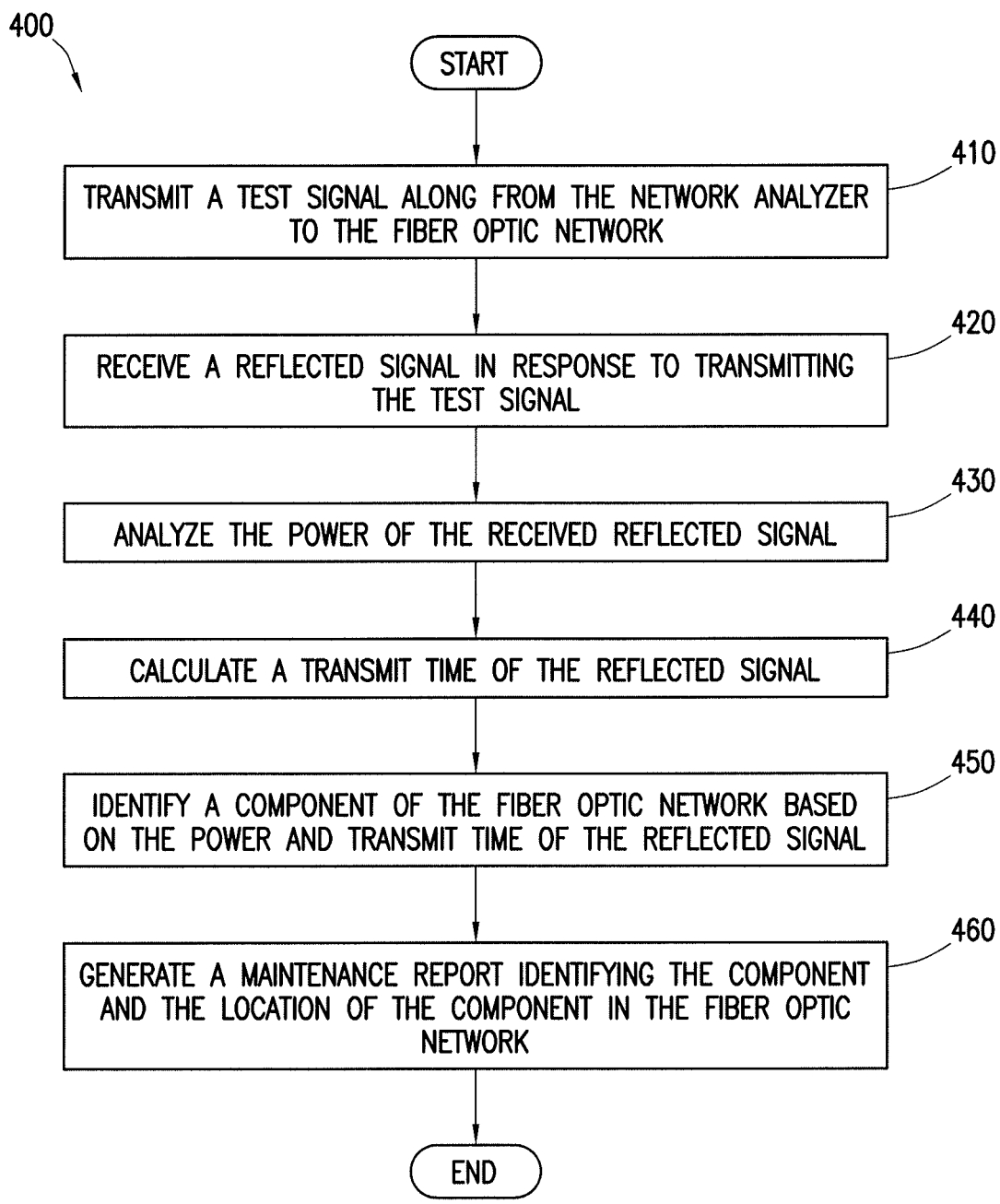
FIG. 4 illustrates a method for analyzing a fiber optical network according to certain embodiments.

FIG. 4 illustrates a method 400 for analyzing a fiber optical network 100 according to certain embodiments. At step 410, analyzer 410 may transmit a test signal to fiber optic network 100. In some embodiments, analyzer 210 may utilize a light conduit (e.g., a fiber optic cable) coupled to processor 120. In some embodiments, analyzer 210 may transmit a number of test signals (i.e., light pulses). As explained in FIG. 2, as the test signal travels along fiber optic network 100, it may encounter a defect such as an air gap in connector 130 or a high bend radius in fiber optics 105. Upon encountering the defect, a portion of the test signal may be reflected back towards analyzer 210.

At step 420, analyzer 210 may receive the reflected signal in response to the test signal encountering a defect in fiber optic network 100. The characteristics of the reflected signal may be determined by the type of defect in fiber optic network 100. For example, as illustrated in FIG. 3, different types of defects generate different magnitudes of reflectance.

At step 430, analyzer 210 may analyze the received signal reflected by fiber optic network 100. In some embodiments, a more powerful reflected signal may indicate a more severe defect in fiber optic network 100. For example, if the end face of connector 130 is dirty, a significant portion of the test signal may be reflected back towards analyzer 210.

At step 440, analyzer 210 may calculate the transmit time of the reflected signal to determine the location of the defect in fiber optic network 100. By knowing when test signal was first transmitted and when the reflected signal was received, analyzer 210 can calculate the distance traveled by the test signal when it encountered the defect causing the reflection.

At step 450, analyzer 450 may identify a component of fiber optic network 100 after measuring the reflectance of the received signal and the transmit time of the received reflected signal. For example, analyzer 210 may determine based on the transmit time that the component at that location in fiber optic network 100 corresponds to a connector 112a. Furthermore, based on the power of the received signal, analyzer 210 may determine that the defect is with an air gap between the connector and the fiber optics 105. In this manner, analyzer 210 may differentiate between different types of components, different types of defects, and identify the location of these defects in fiber optic network 100.

At step 460, analyzer 460 may generate a maintenance report identifying the component and the location of the component in fiber optic network 100. As explained in greater detail in FIG. 2, the maintenance report may include a number of fields. For instance, in some embodiments, the maintenance report may indicate the component causing the defect (e.g., connector 112, fiber optics 105, subsystem 130, processor 120), the location of the component in fiber optic network 100, the type of the component (e.g., an identification of a model number of the component), a condition of the component that causes the defect (e.g., air gap, high bend radius, cracked connector sleeve), a maintenance activity to resolve the defect (e.g., clean the end face of the connector, adjust the bend radius of fiber optics 105, tighten connector 130), and/or a system performance given the defect.

Various embodiments may perform some, all, or none of the steps described above. Furthermore, certain embodiments may perform these steps in a different order or in parallel. Moreover, one or more steps may be repeated. Any suitable component may perform one or more steps of the method.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein.

Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend.

Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A system for analyzing optical networks, the system comprising:
   a network analyzer optically coupled via a light conduit to a fiber optic network, the network analyzer operable to:
   transmit a test signal along the light conduit to the fiber optic network;
   receive a reflected signal in response to transmitting the test signal, wherein the reflected signal is generated in response to the test signal interacting with a defect of the fiber optic network;
   analyze a power of the reflected signal, wherein the power of the reflected signal corresponds to the defect in the fiber optic network;
   calculate a transmit time of the reflected signal, wherein the transmit time corresponds to a location of the defect in the fiber optic network;
   identify a component of the fiber optic network that corresponds to the defect and the location of the defect in the fiber optic network; and
   generate a maintenance report based on the analyzed reflected signal, wherein the maintenance report comprises:
   the identified component;
   the location of the identified component in the fiber optic network; and
   a maintenance activity to resolve the defect.

2. The system of claim 1, wherein the network analyzer is further operable to perform a bit error rate test in response to receiving the reflected signal.

3. The system of claim 1, further comprising a fiber optic extender card, the fiber optic extender card operable to interface with a processor to test one or more subsystems of the fiber optic network.

4. The system of claim 1, wherein the network analyzer is further operable to identify a type of the defect.

5. The system of claim 1, wherein the maintenance report further comprises a condition causing the defect of the identified component.

6. The system of claim 1, wherein the fiber optic network provides communication to a subsystem, the subsystem selected from the group comprising: a radar system, a navigation system, and a communication system.

7. The system of claim 1, wherein the maintenance report further comprises a system performance of the fiber optic network, the system performance indicating whether a network error is caused by the defect in the fiber optic network.

8. A method for analyzing optical networks, the method comprising:
   transmitting, using a network analyzer optically coupled via a light conduit to a fiber optic network, a test signal along the light conduit to the fiber optic network;
   receiving, using the network analyzer, a reflected signal in response to transmitting the test signal, wherein the reflected signal is generated in response to the test signal interacting with a defect of the fiber optic network;
   analyzing, using the network analyzer, a power of the reflected signal, wherein the power of the reflected signal corresponds to the defect in the fiber optic network;
   calculating, using the network analyzer, a transmit time of the reflected signal, wherein the transmit time corresponds a location of the defect in the fiber optic network;
   identifying, using the network analyzer, a component of the fiber optic network that corresponds to the defect and the location of the defect in the fiber optic network; and
   generating, using the network analyzer, a maintenance report based on the analyzed reflected signal, wherein the maintenance report comprises:
      the identified component;
      the location of the identified component in the fiber optic network; and
      a maintenance activity to resolve the defect.

9. The method of claim 8, further comprising:
   performing, using the network analyzer, a bit error rate test in response to receiving the reflected signal.

10. The method of claim 8, further comprising a fiber optic extender card, the fiber optic extender card operable to interface with the processor to test one or more subsystems of the fiber optic network.

11. The method of claim 8, and further comprising identifying, by the network analyzer, a type of the defect.

12. The method of claim 8, wherein the maintenance report further comprises a condition causing the defect of the identified component.

13. The method of claim 8, wherein the fiber optic network provides communication to a subsystem, the subsystem selected from the group comprising: a radar system, a navigation system, and a communication system.

14. The method of claim 8, wherein the maintenance report further comprises a system performance of the fiber optic network, the system performance indicating whether a network error is caused by the defect in the fiber optic network.

15. One or more computer-readable, non-transitory storage media embodying software that is operable when executed to:
   transmit a test signal along a light conduit to a fiber optic network;
   receive a reflected signal in response to transmitting the test signal, wherein the reflected signal is generated in response to the test signal interacting with a defect of the fiber optic network;
   analyze a power of the reflected signal, wherein the power of the reflected signal corresponds to the defect in the fiber optic network;
   calculate a transmit time of the reflected signal, wherein the transmit time corresponds a location of the defect in the fiber optic network;
   identify a component of the fiber optic network that corresponds to the defect and the location of the defect in the fiber optic network; and
   generate a maintenance report based on the analyzed reflected signal, wherein the maintenance report comprises:
      the identified component;
      the location of the identified component in the fiber optic network; and
      a maintenance activity to resolve the defect.

16. The media of claim 15, wherein the software is further operable when executed to perform a bit error rate test in response to receiving a reflected signal.

17. The media of claim 15, wherein the software is further operable when executed to identify a type of the defect.

18. The media of claim 15, wherein the maintenance report further comprises a condition causing the defect of the identified component.

19. The media of claim 15, wherein the fiber optic network provides communication to a subsystem, the subsystem selected from the group comprising: a radar system, a navigation system, and a communication system.

20. The media of claim 15, wherein the maintenance report further comprises a system performance of the fiber optic network, the system performance indicating whether a network error is caused by the defect in the fiber optic network.

* * * * *